United States Patent [19]

Devens, Jr. et al.

[11] Patent Number: 5,898,810
[45] Date of Patent: Apr. 27, 1999

[54] ILLUMINATION WAVEGUIDE AND METHOD FOR PRODUCING SAME

[75] Inventors: Douglas A. Devens, Jr., St. Paul; David J. Lundin, Woodbury; Craig R. Hoff, Champlin; Paul F. Tuckner, Woodbury, all of Minn.

[73] Assignee: Minnesota Mining and Manufacturing Company, St. Paul, Minn.

[21] Appl. No.: 08/832,653

[22] Filed: Apr. 4, 1997

[51] Int. Cl.$^6$ .................................................. G02B 6/02
[52] U.S. Cl. .................... 385/123; 385/126; 385/125; 385/127; 385/141; 385/143; 385/145; 385/901
[58] Field of Search .................................. 385/123, 125, 385/126, 127, 128, 141, 142, 143, 144, 145, 901; 264/1.24, 1.29

[56] References Cited

U.S. PATENT DOCUMENTS

| | | | |
|---|---|---|---|
| Re. 34,901 | 4/1995 | Herbrechtsmeier et al. | 385/143 |
| 3,208,174 | 9/1965 | Wrenshall | 40/130 |
| 3,497,981 | 3/1970 | Tyne | 40/130 |
| 3,602,759 | 8/1971 | Evans | 313/112 |
| 3,641,332 | 2/1972 | Reick et al. | 385/125 X |
| 3,901,674 | 8/1975 | Strack et al. | 385/125 X |
| 3,930,103 | 12/1975 | Chimura et al. | 428/361 |
| 4,104,708 | 8/1978 | Bohli | 362/34 |
| 4,663,107 | 5/1987 | Takada et al. | 264/519 |
| 4,747,662 | 5/1988 | Fritz | 385/125 X |
| 4,806,289 | 2/1989 | Laursen et al. | 264/1.5 |
| 4,937,029 | 6/1990 | Ishiharada et al. | 264/1.4 |
| 4,957,347 | 9/1990 | Zarian | 385/125 X |
| 4,979,799 | 12/1990 | Herbrechtsmeier et al. | 285/141 X |
| 4,984,870 | 1/1991 | Herbrechtsmeier et al. | 385/141 X |
| 4,986,630 | 1/1991 | Herbrechtsmeier et al. | 382/141 X |
| 4,991,932 | 2/1991 | Herbrechtsmeier et al. | 385/141 X |
| 5,027,259 | 6/1991 | Chujko | 362/32 |
| 5,052,778 | 10/1991 | Jamshid | 385/125 |
| 5,124,109 | 6/1992 | Drossbach et al. | 264/508 |
| 5,225,166 | 7/1993 | Zarian et al. | 422/109 |
| 5,235,660 | 8/1993 | Perry et al. | 385/124 |
| 5,242,976 | 9/1993 | Strassel et al. | 525/72 |
| 5,298,327 | 3/1994 | Zarian et al. | 428/373 |
| 5,340,299 | 8/1994 | Jarvenkyla et al. | 425/326.1 |
| 5,419,374 | 5/1995 | Nawrot et al. | 138/137 |
| 5,432,876 | 7/1995 | Appledorn et al. | 385/31 |
| 5,474,822 | 12/1995 | Rober et al. | 428/36.91 |
| 5,500,263 | 3/1996 | Rober et al. | 428/36.6 |
| 5,501,594 | 3/1996 | Glozer et al. | 425/549 |
| 5,512,225 | 4/1996 | Fukushi | 264/127 |
| 5,512,342 | 4/1996 | Rober et al. | 428/36.91 |
| 5,527,858 | 6/1996 | Blong et al. | 525/187 |
| 5,549,948 | 8/1996 | Blong et al. | 428/36.9 |
| 5,552,199 | 9/1996 | Blong et al. | 428/36.9 |
| 5,626,930 | 5/1997 | Fukushi | 428/36.9 |
| 5,638,480 | 6/1997 | Ishiharada et al. | 385/125 |
| 5,692,088 | 11/1997 | Ishiharada et al. | 385/125 |

FOREIGN PATENT DOCUMENTS

| | | | |
|---|---|---|---|
| 1304664 | 7/1992 | Canada | 385/123 X |
| 2114506 | 7/1994 | Canada | 385/123 X |
| 694 794 | 1/1996 | European Pat. Off. | G02B 1/04 |
| 3843310 | 9/1989 | Germany | G02B 6/02 |
| 4444577 | 7/1995 | Germany | G02B 6/02 |
| 62-231904 | 10/1987 | Japan | 385/125 X |
| 1-187505 | 7/1989 | Japan | 385/123 X |
| 7-198947 | 8/1995 | Japan | 385/123 X |
| 7-198951 | 8/1995 | Japan | 385/123 X |
| 7-198953 | 8/1995 | Japan | 385/123 X |
| 8-15527 | 1/1996 | Japan | 385/123 X |
| PCT/US95/ 08065 | 2/1996 | WIPO | 385/141 X |
| PCT/US95/ 10516 | 2/1996 | WIPO | 385/141 X |

OTHER PUBLICATIONS

Dupont, "Extrusion Guide for Melt Processible Fluoropolyumers", (published prior to Mar. 1993).
Remillard et al., *Applied Optics*, 31(34):7232 (1992).
Dupont, "Melt Extrusion Guide" (Mar. 1993).

*Primary Examiner*—Brian Healy
*Attorney, Agent, or Firm*—Stephen W. Buckingham

[57] ABSTRACT

An illumination waveguide that includes: a core having a cross-section in which the shortest dimension of the cross-section is at least one millimeter; and a cladding surrounding the core that includes a polymer having an optically smooth inner surface.

21 Claims, 1 Drawing Sheet

ILLUMINATION WAVEGUIDE AND METHOD FOR PRODUCING SAME

BACKGROUND OF THE INVENTION

The invention relates to producing illumination waveguides.

Illumination waveguides are used in decorative and functional lighting applications. Illumination waveguides typically feature a core through which light is transmitted. The core has a cross-section in which the shortest cross-sectional dimension (e.g., the diameter in the case of waveguides having circular cross-sections) is about one millimeter or larger. Light from a source is coupled into an illumination waveguide and transmitted through the waveguide. The light may be transmitted to an end of the waveguide, providing a point light source, or the light may be transmitted to one or more pre-selected segments of the waveguide where the light is re-directed out of the waveguide in a controlled manner.

An annular cladding surrounds the core and serves to maintain the transmission of light through the core to the preselected location(s) along the waveguide. This property is partially achieved by selecting a cladding having a refractive index lower than the refractive index of the core. However, light may still be scattered from the core (and through the cladding) due to imperfections in the core, cladding, and core/cladding interface. For example, an optically rough inner surface of the cladding, adjacent the core, may cause undesired random scattering of light out of the waveguide.

SUMMARY OF THE INVENTION

In one aspect, the invention features an illumination waveguide that includes a core having a cross-section in which the shortest dimension of the cross-section is at least one millimeter, and a cladding surrounding the core in which the cladding includes a polymer having an optically smooth inner surface. By "optically smooth" it is meant that the surface is essentially free of surface features that contribute to light loss through scattering mechanisms such that the waveguide preferably exhibits less than 75 db/km (0.5%/ft) loss over a range of wavelengths from 370 nm to 800 nm.

In preferred embodiments, the inner surface of the cladding has a root mean square roughness (measured both in the machine direction and the cross-sectional direction) of about 15 nanometers or less, preferably about 10 nanometers or less, and more preferably about 5 nanometers or less. Particularly preferred are claddings in which the inner surface has a root mean square roughness of about 2 nanometers or less. The cladding is preferably immediately adjacent the core along substantially the entire length of the waveguide.

The core is preferably solid. An example of a preferred core is a polymeric light fiber. In one preferred embodiment, the light fiber includes the polymerization product of: (a) from about 100 parts to about 80 parts of a methacrylate monomer derived from the esterification of methacrylic acid with an alcohol having at least 4 carbon atoms, (b) from about 0 parts to about 20 parts of a free radically polymerizable, ethylenically unsaturated crosslinking agent, and (c) from about 0.01 parts to about 5 parts of a free-radical initiator, based upon the total weight of monomer(s) plus crosslinking agent. The core preferably has a refractive index of greater than about 1.45.

Examples of preferred materials for the cladding include heat shrinkable materials, elastomers, and fluoropolymers. Preferred elastomers include thermoplastic polyolefins, polyamides, polyurethanes, and combinations thereof. Preferred fluoropolymers include the polymerization product of tetrafluoroethylene, chlorotrifluoroethylene, hexafluoropropene, vinylidene fluoride, perfluoroalkylvinyl ethers, trifluoroethylene, and combinations thereof. A particularly preferred fluoropolymer includes the polymerization product of tetrafluoroethylene, hexafluoropropene, and vinylidene fluoride.

The cladding may be made of a single polymeric layer, or may include a plurality of concentric layers. One preferred multi-layer cladding includes (a) a first layer comprising a fluoropolymer (e.g., the polymerization product of tetrafluoroethylene, hexafluoropropene, and vinylidene fluoride), (b) a second layer surrounding the first layer comprising a thermoplastic polymer (e.g., a polyurethane), and (c) a third layer surrounding the second layer comprising a thermoplastic polymer (e.g., a polyolefin).

In a second aspect, the invention features an illumination waveguide that includes a solid, polymeric core having a cross-section in which the shortest dimension of said cross-section is at least one millimeter. The outer surface of the core is optically smooth. Preferably, the outer surface has a root mean square roughness (measured both in the machine direction and the cross-sectional direction) of about 15 nanometers or less.

In a third aspect, the invention features a hollow profile (e.g., a tube) that includes a polymer having an optically smooth inner surface. The hollow profile has a cross-section in which the shortest dimension of the cross-section is greater than one millimeter.

In preferred embodiments, the inner surface of the hollow profile has a root mean square roughness (measured both in the machine direction and the cross-sectional direction) of about 15 nanometers or less. In one preferred embodiment, the hollow profile is provided in the form of a cladding adapted for combination with a core having a cross-section in which the shortest dimension of the cross-section is at least one millimeter.

The hollow profile may feature a single polymeric layer or may include a plurality of concentric layers. Preferred materials for the hollow profile include fluoropolymers. One preferred embodiment of a multi-layered hollow profile includes (a) a first layer comprising a fluoropolymer (e.g., the polymerization product of tetrafluoroethylene, hexafluoropropene, and vinylidene fluoride), (b) a second layer surrounding the first layer comprising a thermoplastic polymer (e.g., a polyurethane), and (c) a third layer surrounding the second layer comprising a thermoplastic polymer (e.g., a polyolefin).

In a fourth aspect, the invention features a method for producing an illumination waveguide that includes extruding a polymer composition to form a hollow profile (e.g., a tube) having an optically smooth inner surface, and combining the hollow profile with a waveguide core. Preferably, the waveguide core is formed by filling the hollow profile with a polymerizable composition capable of forming a waveguide core upon curing, and then curing the polymerizable composition.

The method may be used to prepare single or multi-layer hollow profiles. In the latter case, the method includes co-extruding a plurality of polymer compositions to form a hollow profile that includes a plurality of concentric layers and has an optically smooth inner surface. In one embodiment, particularly useful in the case of multi-layer hollow profiles, the method includes extruding the polymer composition through a die that includes a heated tip positioned at the point where the composition exits the die. The tip is maintained at a temperature higher than the temperature of the polymer composition during extrusion.

In a fifth aspect, the invention features a method for producing a hollow profile (e.g., a tube) that includes extruding a polymer composition to form a hollow profile having an optically smooth inner surface. The hollow profile has a cross-section in which the shortest dimension of the cross-section is greater than one millimeter.

The invention provides illumination waveguides in the form of a core, or a core surrounded by a single or multi-layer polymeric cladding, having improved optical properties. By extruding a polymer composition to form a hollow profile (e.g., a tube) having an optically smooth inner surface, and then using this smooth-walled hollow profile as a mold for preparing a core, cores having optically smooth outer surfaces can be prepared. The hollow profile may also act as a cladding for the core, in which case an illumination waveguide having a core with an optically smooth outer surface and a cladding with an optically smooth inner surface results. Because the surfaces are smooth, light scattering is reduced. As a result, more light is transmitted through the waveguide and delivered to the desired location.

The smooth-walled multi-layer hollow profiles and claddings which the invention provides offer additional advantages. For example, the use of multiple layers permits the properties of the hollow profiles and claddings to be tailored to meet the requirements of the specific application in which the waveguide is used. Thus, the invention provides greater design freedom compared to single-layer constructions.

Other features and advantages of the invention will be apparent from the following description of the preferred embodiments thereof, and from the claims.

DESCRIPTION OF THE PREFERRED EMBODIMENTS

Figure 1:
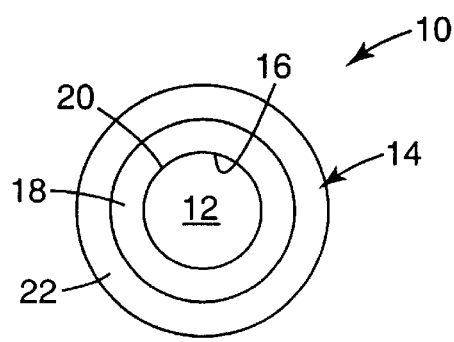
FIG. 1 shows an embodiment of an illumination waveguide according to the invention.

An illumination waveguide 10 includes a core 12 and multi-layer tubular cladding 14, as shown in FIG. 1. Core 12 typically has a generally circular cross-sectional shape, but may have various cross-sectional geometries, e.g., rectangular or elliptical, depending on the specific illumination application for waveguide 10. Core 12 preferably has an optically smooth outer surface to reduce light scattering and thereby increase the efficiency of light transportation along the core. Cores having optically smooth outer surfaces are particularly desirable where the illumination waveguide is designed to emit light exclusively from the end of the waveguide, or where precise light extraction using microstructured surfaces adjacent the core is desired. Preferably, the outer surface of core 12 has a root mean square (RMS) roughness of about 15 nanometers (nm) or less, as measured using a Wyko interferometer according to the protocol described in the Examples, below. More preferably, the outer surface has an RMS roughness of about 10 nanometers or less, even more preferably about 5 nanometers or less. In a particularly preferred embodiment, the outer surface has an RMS roughness of about 2 nanometers or less.

Core 12 is made of a material having a relatively high refractive index for the transmission of light. For example, a core material having a refractive index of about 1.45 or greater may be used. Additionally, the material selected for core 12 needs to be compatible with the cladding materials and suitably flexible so that waveguide 10 may be flexible. Also, the material selected for core 12 needs to meet various operational parameters, such as stability at desired temperature ranges, and transparency over the desired spectral range.

Core 12 may be in the form of a solid, liquid, or gel, with solid materials being preferred. In one embodiment, core 12 is a solid polymeric light fiber formed by copolymerizing at least one methacrylate monomer (derived from the esterification of methacrylic acid with an alcohol having at least 4 carbon atoms) with an ethylenically-unsaturated, free-radically polymerizable crosslinking agent.

Particularly useful methacrylate monomers include n-butyl methacrylate, n-hexyl methacrylate, 2-ethylhexyl methacrylate, n-octyl methacrylate, isooctyl methacrylate, decyl methacrylate and dodecyl methacrylate, and combinations thereof.

Crosslinking agents useful in forming the light fiber are those ethylenically-unsaturated free-radically polymerizable compounds possessing two or more free-radically polymerizable ethylenically unsaturated reactive moieties, such as, for instance, acrylate, methacrylate, allyl, or styryl groups, or the like. Preferred crosslinking agents are dimethacrylates and diallyl compounds, most preferably dimethacrylate compounds.

Useful dimethacrylate crosslinking agents include hexanediol dimethacrylate, ethylene glycol dimethacrylate, diethylene glycol dimethacrylate, triethylene glycol dimethacrylate, tetraethylene glycol dimethacrylate, propylene glycol dimethacrylate, trimethylol propane diemthacrylate, and methacrylate-terminated oligomers such as polyethylene glycol dimethacrylate (commercially available from Sartomer Chemicals under various tradename designations) and polypropylene oxide dimethacrylate, and combinations thereof. Preferably, the dimethacrylate crosslinking agent is selected from the group consisting of diethylene glycol dimethacrylate, triethylene glycol dimethacrylate, tetraethylene glycol dimethacrylate, propylene glycol diemthacrylate, and combinations thereof.

Methacrylate monomers and dimethacrylate crosslinking agents, when purchased from commercial sources, are preferably purified to remove inhibitors, colorants, and any other additives commonly used. They can be purified by any of a number of common procedures used for sample preparation. These methods include, e.g., vacuum distillation, ion exchange column chromatography, and liquid—liquid extraction.

Free-radical initiators useful in preparing the light fibers of the invention can be any of a number of art-known thermal initiators, including azo compounds and peroxides.

Suitable azo initiators include 2,2'-azobis(4-methoxy-2,4-dimethylvaleronitrile) (VAZO™ 33), 2,2'-azobis(2-amidinopropane) dihydrochloride (VAZO™ 50), 2,2'-azobis(2,4-dimethylvaleronitrile) (VAZO™ 52), 2,2'-azobis(isobutyronitrile) (VAZO™ 64), 2,2'-azobis(2-methylbutyronitrile) (VAZO™ 67), and 1,1'-azobis(1-cyclohexanecarbonitrile) (VAZO™ 88), all of which are available from DuPont Chemicals, Wilmington, Del., and 2,2'-azobis(methyl isobutyrate) (V-601™), available from Wako Chemicals USA Inc., Richmond, Va.

Suitable peroxide initiators include benzoyl peroxide, acetyl peroxide, lauroyl peroxide, decanoyl peroxide, diacetyl peroxydicarbonate, di(4-t-butylcyclohexyl) peroxydicarbonate (Perkadox™ 16, available from Akzo, Nobel Chemicals, Inc., Chicago, Ill.), di(2-ethylhexyl) peroxydicarbonate, t-butylperoxypivalate (Lupersol™ 11, available from Elf Atochem North America, Philadelphia, Pa.), diisopropyl peroxydicarbonate (available from PPG Industries, Inc., Chemicals Group, Pittsburgh, Pa.), t-butylperoxy-2-ethylhexanoate (Trigonox™ 21-C50, available from Akzo, Nobel Chemicals, Inc.), and dicumyl peroxide.

The initiator is present in a catalytically effective amount, typically in the range of from about 0.01 parts to 5 parts, and more preferably in the range of from about 0.025 parts to about 2 parts by weight, based upon 100 total parts by weight of monomer(s). If a mixture of initiators is used, the total amount of the mixture of initiators would be as if a single initiator was used. Further details on the polymeric light fiber may be found in commonly assigned U.S. patent application Ser. No. 08/605,830, filed Feb. 23, 1996, and incorporated herein by reference.

Other materials may also be used to form core 12, including urethanes, urethane acrylates, polymethyl methacrylate, silicones, and polycarbonates.

Multi-layer cladding 14 surrounds core 12. Cladding 14 is generally co-extensive with the length of core 12, but may be masked or removed at selected locations, e.g., for coupling or light extraction. As shown in the embodiment of FIG. 1, cladding 14 has a first, inner layer 18 surrounding core 12. Inner layer 18 has a refractive index lower than core 12. For example, layer 18 may have a refractive index at least about 0.1 less than the refractive index of core 12.

Layer 18 has an inner surface 20 adjacent the outer surface 16 of core 12. Surfaces 16 and 20 form the core/cladding interface. Surfaces 16, 20 may sit flush to one another, as shown in FIG. 1, or there may be a small gap between surfaces 16, 20. In order to reduce, if not eliminate, light scattering caused by the cladding, surface 20 is optically smooth. Preferably, surface 20 has a root mean square (RMS) roughness of about 15 nanometers (nm) or less, as measured using a Wyko interferometer according to the protocol described in the Examples, below. More preferably, surface 20 has an RMS roughness of about 10 nanometers or less, even more preferably about 5 nanometers or less. In a particularly preferred embodiment, surface 20 has an RMS roughness of about 2 nanometers or less.

Inner layer 18 is preferably formed of a fluoropolymer. Suitable fluoropolymers include the polymerization product of monomers selected from the group consisting of tetrafluoroethylene, chlorotrifluoroethylene, hexafluoropropene, vinylidene fluoride, perfluoroalkylvinyl ethers such as perfluoropropyl vinyl ether, trifluoroethylene, and combinations thereof. Specific examples include poly (tetrafluoroethylene) (PTFE), poly(tetrafluoroethylene-co-hexafluoropropene-co-vinylidene fluorine), fluorinated ethylene polymer (FEP), ethylene-co-tetrafluoroethylene (ETFE), poly (vinylidene fluoride) (PVdF), poly (chlorotrifluoroethylene) (PCTFE), and ethylene-co-chlorotrifluoroethylene (ECTFE). The preferred fluoropolymer is poly(tetrafluoroethylene-co-hexafluoropropene-co-vinylidene fluoride). Such fluoropolymers are commercially available from Dyneon LLC, St. Paul, Minn. under the designation "THV™" fluoropolymers.

Layer 18 of cladding 14 may also be heat shrinkable. Heat shrinkable materials offer the advantage of closing any gaps between core 12 and cladding 14, resulting in more uniform light transmission.

In order to minimize the amount of fluoropolymer or other material required to form layer 18, thereby lowering the overall cost of waveguide 10, the thickness of layer 18 is preferably minimized, while maintaining the desired optical qualities of the cladding. In general, layer 18 has an average minimum thickness of about 50 microns, depending on the specific process and tooling used to form cladding 14.

A second layer 22 surrounds first layer 18, as shown in FIG. 1. Second layer 22 may form the outer, exposed layer of cladding 14, or additional layers (not shown) may be positioned around layer 22. Second layer 22 is preferably formed of thermoplastic polymers, thermoplastic elastomers, thermosetting elastomers, or combinations thereof. Specifically, second layer 22 may be formed of polymers such as thermoplastic polyolefins, polyamides, polyurethanes, blends of the aforementioned with fluoropolymers, block copolymers and graft copolymers thereof, and combinations of the above.

Figure 2:
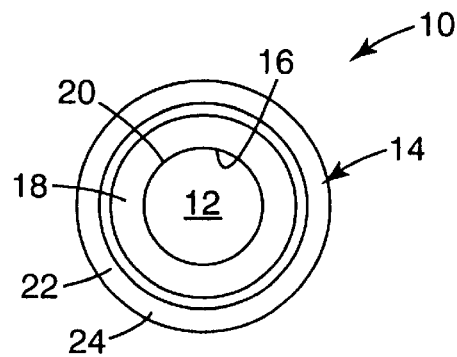
FIG. 2 shows another embodiment of an illumination waveguide according to the invention.

In another embodiment, second layer 22 forms a bonding or tie layer between inner layer 18 and a third layer 24, as shown in FIG. 2. For example, the necessary characteristics for layer 24 (e.g., stability, flexibility) may require a material that does not adequately bond with inner layer 18, e.g., a fluoropolymer. In one embodiment, second layer 22 is formed of an adhesive. In another embodiment, second layer 22 is formed of a blend of poly (vinylidene fluoride) (PVdF) and polymethyl methacrylate, suitable for bonding with a third layer 24 formed of PVdF or other materials.

Claddings for illumination waveguides are preferably prepared using a tube extrusion process. Pellets of a thermoplastic material from which a tube is to be made are fed into an extruder through a hopper. Pellets are introduced into several heated zones of the extruder barrel, where they are melted, mixed, and delivered to a die that is configured to form the appropriate shape (e.g., tubular, square, polygonal, etc.). From the die, the extrudate enters a sizing system that helps maintain the tubing's shape while it is cooling. Typically, the sizing system features a water trough containing sizing dies or orifices situated immediately downstream from the extrusion die. After exiting the sizing system, the tubing enters a cooling water trough. When cooled, the sized tubing is typically wound on a spool for further processing.

Many types of suitable extruders are known, including co-rotating and counter-rotating twin screw, or single screw with one of many screw designs. A preferred extruder configuration includes two single-screw extruders feeding a single tubing die. One extruder melt-processes an inner cladding layer, e.g., a fluoropolymer, while a second extruder supplies a polymer melt which forms an outer layer surrounding the inner layer. These extruders have heating zones that melt the polymer as the polymer is conveyed through the extruder barrel. The screw feeds, mixes, melts, and conveys the molten polymer to the die. The temperature profile, screw speed, and other common operating conditions are selected to optimize the supply of polymer to the die.

Tubing dies can be of many designs. Wall thickness and adhesion between layers are controlled by, e.g., the point at the polymers contact each other in the die to the point at which they exit the die. For optimum inter-layer adhesion, the die (referred to as a "common land" type die) is designed for early contact of the different molten polymers. In the "common land" type co-extrusion method, molten polymer layers are formed within the die prior to exiting. For improved wall thickness control, contact between polymer layers in the die is preferably minimized by using a "multiple gap" type die. In the "multiple gap" type die, die components form the layers within the die itself, preventing contact until the layers exit the die.

As discussed above, the inner surface of cladding 14 and the outer surface of core 12 are preferably optically smooth. A major contributor to surface roughness is melt fracture of the polymer at the tooling-polymer interface during extrusion; mechanical factors such as tooling smoothness and polymer contamination/purity contribute as well, although to a lesser extent. Melt fracture is caused by unstable flow of the polymer at the interfaces between the die and the polymer at elevated shear stresses, resulting in a "shark skin" or mottled appearance. Melt fracture defects act as light extraction points in the cladding, and are thus undesirable. Co-extrusion processes designed to produce multi-layer, thin-walled products at high speeds are particularly prone to producing tubing having melt fracture defects.

Figure 3A:
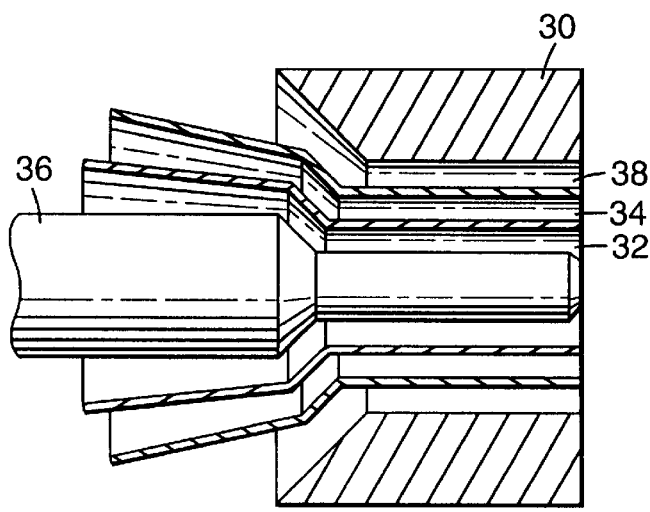
FIGS. 3A and B shows an extrusion die and tip with a heating element.
Figure 3B:
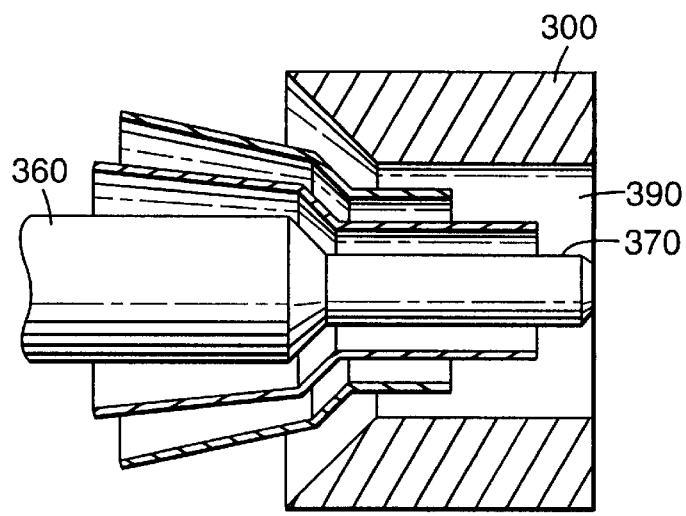

To minimize or eliminate melt fracture in the innermost (e.g., fluoropolymer) layer of a multi-layer construction having three or more layers, and thereby create an optically smooth inner surface, the individual layers are preferably co-extruded to form an integrally bonded multi-layer tube using a die incorporating a heated central pin around which higher temperature extrudate flows, as shown in FIGS. 3A and 3B. FIG. 3A represents a "multiple gap" type die, while FIG. 3B represents a "common land" type die.

Referring to FIG. 3A, a die 30 has an orifice 39 made up of individual concentric orifices 32, 34, and 38 surrounding a heated pin 36. Molten fluoropolymer 18 flows nearest to heated pin 36 as the extruded tube exits the die. Pin 36 is heated to a temperature higher than the melting point of fluoropolymer 18, thus reducing shear stress at the polymer-pin interface. At the same time, polymer 22, which forms the middle tie layer, and lower melting polymer 24, which forms the outer cover or jacketing layer, flow throguh the die and exit from orifices 34 and 38, respectively. All three layers meet at a common point outside of the die, thus constituting a "multiple gap" die.

Referring to FIG. 3B, a die 300 has an orifice 390 surrounding a central heated pin 360. Molten fluoropolymer 18 flows nearest to heated pin 36 as the extruded tube exits the die. At the same time, polymer 22, which forms the middle tie layer, and lower melting polymer 24, which forms the outer cover or jacketing layer, flow throguh the die, contacting each other inside the die in region 370 while still molten, thus constituting a "common land" die.

Fluoropolymer extrusion to produce tubing using a heated pin die has been described in, e.g., Extrusion Guide for Melt Processible Fluoropolymers, E. I. DuPont Co. Dies containing a heated pin are commercially available from, for example, Guill Tool and Engineering Co., Inc. (West Warwick, R.I.) and Genca (Clearwater, Fla.).

The multi-layer cladding is formed by the extrusion die. To maintain its dimensions, a sizing die is used while cooling the tubing. A sizing die controls the outer diameter while allowing coolant to flow over the tubing. Typically, water is used as the coolant. The cooled tubing can then be dried and used directly or coiled for storage.

In a preferred method for preparing an illumination waveguide, a tubular segment of cladding 14, e.g., measuring about 100 feet in length, is cut and used as a mold for core 12. In this way, a core having an optically smooth outer surface and cladding having an optically smooth inner surface can be produced. The monomer(s), crosslinking agent(s), and initiator(s) used to form the core are mixed and then introduced into the cladding segment under a slight vacuum. The cladding segment is formed into a U-shape and then placed into a reactor pressurized with nitrogen (e.g., about 250 psi). Once in the reactor, the mixture is progressively polymerized from one end of the cladding segment to the other by heating the length of the tube progressively at a rate of about 0.75 to about 1.5 meters per hour, using cold nitrogen to provide a cold, non-reactive zone and heated water to create a zone that is warm enough to induce the polymerization reaction while, at the same time, carrying away excess heat of reaction. The procedure and apparatus used is described in detail in U.S. Pat. Nos. 5,122,580, 5,298,327 and 5,225,166, the contents of which are incorporated herein by reference.

The polymerization temperature is selected based upon the particular monomers used. In general, the temperature at which the polymerization takes place ranges from about 0° C. to about 50° C., preferably from about 20° C. to about 50° C., and more preferably from about 30° C. to about 45° C.

During the polymerization process, one end of the cladding segment may be covered and pressure applied to the open end. As the material polymerizes, it tends to shrink away from the inner surface of the cladding, creating a gap. The pressure exerted on the core material is sufficient to cause the curing material to shrink in the direction of the major axis of the cladding segment and remain flush with the inner surface of the cladding segment. Consequently, any gap between core and cladding is eliminated or reduced, and the outer surface of the core is optically smooth due to the smooth inner surface of the cladding.

The invention will now be described further by way of the following examples.

EXAMPLES

Roughness Measurement

Roughness measurements were performed using a WYKO RST Roughness/Step Tester (WYKO Corp., Tucson, Ariz.). A square section, about 5 mm on a side, was cut from the sample and placed on the microscope stage of the WYKO instrument. Uniformity of the sample was verified by an initial scan at 10× magnification, and defects or unusual structures were scanned and recorded but were not included in roughness calculations.

If the sample was relatively smooth, e.g., surface features were less than approximately 75 nanometers (nm) in depth, according to the initial scan, measurements were taken in "PSI mode," using light of 633 nm wavelength, at 40× magnification. Samples were scanned in two to four areas and $R_a$ (average roughness) and $R_q$ (RMS roughness) values reported by the WYKO program software were recorded and averaged.

If sample features were larger than 75 nm, two to four scans in "VSI mode," at 10× magnification, were taken and $R_a$ and $R_q$ values were reported. A smooth area between deeper surface features was then chosen for scanning at 40×, in the PSI mode.

Tubing Extrusion

THV 200™ and THV 500™ tubing with a coextruded polyethylene outer jacket was prepared as follows:

THV (both formulations available from Dyneon LLC, St. Paul, Minn.) was extruded using a 3.175 cm (1¼") diameter, 24 L/D extruder equipped with a Davis-Standard designed barrier screw to which a die was attached by a 20.3 cm×1.3–1.9 cm (8"×½"–¾") uninsulated neck tube.

Polyethylene (PE) was extruded using a 6.35 cm (2½") diameter, 24 L/D extruder equipped with a general purpose screw. The extruder was attached to the die by a 6–8 cm×1.9 cm (2–3"×¾") uninsulated neck tube.

A multiple manifold (two die gaps) die having a central pin threaded at the base was connected to both the THV and polyethylene extruders as described above. The central pin supplied air to the inside of the extruded tube so as to expand the tube to a desired diameter. The extruded, expanded tube was pulled through a water bath held at approximately 18° C. and onto a takeup reel.

Example 1

In the equipment and manner described above, a multi-layer tube featuring THV 200™ surrounded by polyethylene was prepared. The THV extruder zones were set at (front-to-back) 246–235–204° C., with a die adapter zone at 254° C. and a melt temperature of 260° C. Polyethylene (Petrothene™, Quantum Chemical Co., Cincinnati, Ohio) extruder zones were set at (front-to-back) 171–166–160° C., with a die adapter zone at 177° C. and the die body at 204° C. Both extruders ran at 20 rpm. The die was configured with a 1.3 cm land, 0.87 cm diameter inner pin and 0.18 cm annular gap for THV, and 1.35 cm pin, 2.13 cm outer wall and 0.42 cm annular gap for PE. Approximately 165 m (500 feet) of tubing were obtained. Interior surface roughness Ra was 1 nm; Rq was 2 nm.

Example 2

An illumination waveguide having a light fiber core was prepared according to the procedure described in U.S. Pat. No. 5,225,166 (incorporated by reference) using the tubing prepared in Example 1 as a mold. To form the light fiber core, the tubing was filled with a photopolymerizable formulation containing 50% by weight n-butyl methacrylate and 50% by weight 2-ethylhexyl methacrylate (which, in turn, contained 0.05% by weight hexanediol dimethacrylate and 0.2% by weight Perkadox 16™ photoinitiator). Following polymerization, the tubing was stripped from the light fiber core by slitting the tube. Roughness measurements of the light fiber core and tubing were:

Tubing Ra=2 nm; Clad Rq=3 nm

Core Ra=5 nm; Core Rq=6 nm

Example 3

A multi-layer tube featuring a fluoropolymer core, an intermediate tie layer, and an outer polyamide (Nylon 12) layer was prepared from THV 500™ fluoropolymer Dyneon LLC, St. Paul, Minn.), Vestamid L2140™ nylon 12 (Hüls America, Inc., Piscataway, N.J.), and a tie layer composition consisting of a mixture of Vestamid L2140 nylon 12 with 1.0% by weight 1,12-dodecyl diamine (Aldrich). The tie layer composition was prepared according to the procedure described in Example 1 of Fukushi, U.S. Ser. No. 08/516,165, filed Aug. 19, 1994, entitled "Multi-layer Compositions Having a Fluoropolymer Layer," assigned to the same assignee as the present application and hereby incorporated by reference.

Each component of the tube was processed in a separate extruder, the outputs of which were fed to a Genca Mini Tri-Die™ Model 1 three-layer tubing die (Genca, Clearwater, Fla.) equipped with a heated central pin. The extruders were configured as shown in Table 3:

TABLE 3

| Extruder | Nylon 12 | Tie Layer | THV 500 |
|---|---|---|---|
| Extruder (dia. cm) | 2.54 | 1.27 | 2.54 |
| Zone Temperature ° C. | | | |
| 1 | 210 | 210 | 238 |
| 2 | 218 | 221 | 254 |
| 3 | 221 | 227 | 260 |
| Clamp | 221 | — | — |
| Adaptor | 221 | — | 254 |
| Nozzle | 221 | — | 254 |
| Die | 238 | — | — |
| Head | — | 243 | — |
| Pressure (Mpa) | 38.77 | — | 28.98 |
| Melt Temp ° C. | 211 | — | 240 |
| RPM | 79 | — | — |

In Table 3, zone temperatures 1, 2 and 3 refer to temperatures progressively closer to the die head, respectively. The nylon 12 extruder was also equipped with a heated clamp, adaptor and nozzle leading to the die. The tie layer extruder was heated only at the adaptor, which controlled heat to the die body, referred to as the "Head." The THV 500 extruder had only an adaptor and nozzle heater. The temperature of the heated pin was 199–232° C. Visual inspection indicated the tube had a smooth inner inner THV 500 surface essentially free of melt fracture defects.

Example 4

An illumination waveguide was prepared using the tubing prepared in Example 3 and, to form the core fiber, a polymerizable formulation of n-butyl methacrylate containing 0.05% by weight hexanediol dimethacrylate and 0.2% by weight Perkadox 16™ photoinitiator. A 15.2 cm section of the tubing was crimped on one end, filled with the polymerizable mixture, and then heated in a hot water bath at 70° C. for 2 hours. A solid, transparent polymeric light fiber was obtained, surrounded by the multi-layer tube.

Example 5

In the equipment and manner described above, a multi-layer tube featuring THV 500™ tubing surrounded by polyethylene was prepared. The THV extruder zones were set at (front-to-back) 285–277–249° C., with a die adapter zone at 293° C. and a melt temperature of 294° C. Extruder speed was 18 rpm and head pressure was 20.0 MPa (2900 psi). Polyethylene (Petrothene™, Quantum Chemical Co., Cincinnati, Ohio) extruder zones were set at (front-to-back) 171–166–157° C., with the die front zone at 224° C., melt temperature of 152° C., and the die back zone at 177° C. Extruder speed was 17 rpm and head pressure was 7.79 MPa (1130 psi). The die was configured with a 1.3 cm land, 6.86 mm dia. inner pin and 1.8 mm annular gap for THV, and 17.5 mm pin, 26.8 mm outer wall and 4.2 mm annular gap for PE. Air pressure inside the THV tube was 1.38 KPa (0.20 psi), with a vacuum of 6.2 KPa (25 inches of water) over the water bath. Approximately 610 m (2000 feet) of tubing were obtained. Interior surface roughness Ra was 5 nm; Rq was 6 nm.

Example 6

An illumination waveguide having a light fiber core was prepared according to the procedure described in U.S. Pat. No. 5,225,166 (incorporated by reference), using the tubing prepared in Example 5 as a mold. To form the light fiber core, the tubing was filled with a photopolymerizable formulation containing 50% by weight n-butyl methacrylate and 50% by weight 2-ethylhexyl methacrylate (which, in turn, contained 0.05% by weight hexanediol dimethacrylate and 0.2% by weight Perkadox 16™ photoinitiator). Following polymerization, the tubing was stripped from the light fiber core by slitting the tube. Roughness measurements of the light fiber core and tubing were:

Tubing Ra=3 nm; Clad Rq=4 nm

Core Ra=9 nm; Core Rq=12 nm based on two measurements each on two fibers made from the same tubing sample.

Example 7

Two-layer tubing (THV fluoropolymer and polyethylene) was prepared in a two-step procedure in which THV fluoropolymer tubing was extruded, collected, and then coated with a layer of polyethylene in a separate step.

THV 500™ Tube

Tubing of approximately 13 mm OD was prepared, using a 63.5 mm diameter extruder with temperature zones of 249–260–288° C. and a die temperature of 288° C. Screw speed was 11 rpm, and air pressure inside the tube was 0.897 KPa. Die opening (OD) was 27.43 mm with a pin diameter of 16.3 mm. Vacuum calibration was set at 14.6 mm. Approximately 824 meters of tubing having an OD of 13.46 mm and thickness of 0.56 mm was prepared at a line speed of 6.4 m/min, the tubing being collected on a standard take-up spool.

Polyethylene Cover Coating

The THV tubing was fed through the barrel of a 63.5 mm-diameter extruder from which the screw had been removed and into a cross-head coating die, emerging after coating into a water cooling trough. An extruder measuring 31.75 mm in barrel diameter was used for polyethylene (Petrothene™, Quantum Chemical Co., Cincinnati, Ohio), with heating zones of 127–121–116° C., adapter at 132° C. and the die at 143° C. At a screw speed of 90 rpm, 824 meters of THV tubing was coated at an output speed of approximately 2 m/min with a 2.8 mm thick polyethylene coating.

Illumination Waveguide

The two-layer THV/polyethylene tubing was used in the preparation of an illumination waveguide according to the procedure described in Example 2. Prior to making the core fiber, the inner surface of the THV tubing had roughness Ra=2 nm and Rq=3 nm. The light fiber core prepared in the tube had roughness Ra=5 nm and Rq=5 nm, while the inner surface of the THV tube, after preparation of the light fiber core, had roughness Ra=2 nm and Rq=3 nm.

Other embodiments are within the following claims.

For example, the cladding surrounding the core may be a single layer cladding. Similarly, tubes used to prepare the core may be single layer tubes.

What is claimed is:

1. An illumination waveguide comprising:

a solid core having a cross-section in which the shortest dimension of said cross-section is at least one millimeter; and a cladding surrounding said core, said cladding comprising a polymer having an optically smooth inner surface.

2. The illumination waveguide of claim 1 wherein said inner surface has a root mean square roughness of about 15 nanometers or less.

3. The illumination waveguide of claim 1 wherein said inner surface has a root mean square roughness of about 10 nanometers or less.

4. The illumination waveguide of claim 1 wherein said inner surface has a root mean square roughness of about 5 nanometers or less.

5. The illumination waveguide of claim 1 wherein said inner surface has a root mean square roughness of about 2 nanometers or less.

6. The illumination waveguide of claim 1 wherein said core comprises a polymeric light fiber.

7. The illumination waveguide of claim 6 wherein said polymeric light fiber comprises the polymerization product of:

(a) from about 100 parts to about 80 parts of a methacrylate monomer derived from the esterification of methacrylic acid with an alcohol having at least 4 carbon atoms;

(b) from about 0 parts to about 20 parts of a free radically polymerizable, ethylenically unsaturated crosslinking agent; and, (c) from about 0.01 parts to about 5 parts of a free-radical initiator, based upon the total weight of monomer(s) plus crosslinking agent.

8. The illumination waveguide of claim 1 wherein said core has a refractive index of greater than about 1.45.

9. The illumination waveguide of claim 1 wherein said cladding comprises a plurality of concentric layers.

10. The illumination waveguide of claim 1 wherein said cladding comprises a heat shrinkable material.

11. The illumination waveguide of claim 1 wherein said cladding comprises a fluoropolymer.

12. The illumination waveguide of claim 11 wherein said fluoropolymer comprises the polymerization product of tetrafluoroethylene, chlorotrifluoroethylene, hexafluoropropene, vinylidene fluoride, perfluoroalkylvinyl ethers, or trifluoroethylene.

13. The illumination waveguide of claim 11 wherein said fluoropolymer comprises the polymerization product of tetrafluoroethylene, hexafluoropropene, and vinylidene fluoride.

14. The illumination waveguide of claim 1 wherein said cladding comprises an elastomer.

15. The illumination waveguide of claim 14 wherein said elastomer comprises a thermoplastic polyolefin, polyamide, or a polyurethane.

16. The illumination waveguide of claim 9 wherein said cladding comprises: (a) a first layer comprising a fluoropolymer; (b) a second layer surrounding said first layer comprising a thermoplastic polymer; and (c) a third layer surrounding said second layer comprising a thermoplastic polymer.

17. The illumination waveguide of claim 9 wherein said cladding comprises: (a) a first layer comprising the polymerization product of tetrafluoroethylene, hexafluoropropene, and vinylidene fluoride; (b) a second layer surrounding said first layer comprising a thermoplastic polymer; and (c) a third layer surrounding said second layer comprising a thermoplastic polymer.

18. The illumination waveguide of claim 1 wherein said cladding is immediately adjacent said core.

19. The illumination waveguide of claim 1 wherein said cladding is immediately adjacent said core along substantially the entire length of said waveguide.

20. An illumination waveguide comprising a solid, polymeric core having a cross-section in which the shortest dimension of said cross-section is at least one millimeter, said core having an optically smooth outer surface.

21. The illumination waveguide of claim 20 wherein said outer surface has a root mean square roughness of about 15 nanometers or less.

* * * * *

UNITED STATES PATENT AND TRADEMARK OFFICE
CERTIFICATE OF CORRECTION

PATENT NO. : 5,898,810
DATED : April 27, 1999
INVENTOR(S) : Douglas A. Devens, Jr., David J. Lundin, Craig R. Hoff and Paul F. Tuckner Page 1 of 1

It is certified that error appears in the above-identified patent and that said Letters Patent is hereby corrected as shown below:

Column 7,
Lines 15 and 24, "throguh" should read -- through --.

Signed and Sealed this

Twenty-first Day of May, 2002

Attest:

Attesting Officer

JAMES E. ROGAN
Director of the United States Patent and Trademark Office